US010926361B2

(12) United States Patent
Gruenewald et al.

(10) Patent No.: US 10,926,361 B2
(45) Date of Patent: Feb. 23, 2021

(54) MULTI-LAYERED ALUMINUM STRIP FOR BRAZING, BRAZING COMPONENT, MANUFACTURING METHOD AND HEAT EXCHANGER AND USE

(75) Inventors: Bernd Gruenewald, Nuertingen (DE); Alexander Wald, Sindelfingen (DE); Alan Gray, Oxon (GB)

(73) Assignee: MAHLE International GmbH, Stuttgart (DE)

(*) Notice: Subject to any disclaimer, the term of this patent is extended or adjusted under 35 U.S.C. 154(b) by 1409 days.

(21) Appl. No.: 13/117,877

(22) Filed: May 27, 2011

(65) Prior Publication Data

US 2011/0290458 A1 Dec. 1, 2011

Related U.S. Application Data

(63) Continuation of application No. PCT/EP2009/065404, filed on Nov. 18, 2009.

(30) Foreign Application Priority Data

Nov. 28, 2008 (DE) .................. 10 2008 059 450

(51) Int. Cl.
  *B23K 31/02* (2006.01)
  *B23K 35/28* (2006.01)
  (Continued)

(52) U.S. Cl.
  CPC ........ *B23K 35/286* (2013.01); *B23K 35/0238* (2013.01); *C22C 21/00* (2013.01);
  (Continued)

(58) Field of Classification Search
  CPC ........ F28F 21/084; F28F 21/089; F28F 19/06; F28D 7/00; B23K 7/00; B23K 35/02
  (Continued)

(56) References Cited

U.S. PATENT DOCUMENTS 2,821,014 A  1/1958 Miller
4,146,164 A * 3/1979 Anderson ............. B23K 20/04
                                           228/158
(Continued)

FOREIGN PATENT DOCUMENTS

CA  2 482 914 A1  10/2003
CH    356333       9/1961
(Continued)

OTHER PUBLICATIONS

Chinese Office Action for Chinese Application No. 200980147710.4 dated Apr. 28, 2013 with English translation.

*Primary Examiner* — Travis C Ruby
*Assistant Examiner* — Harry E Arant
(74) *Attorney, Agent, or Firm* — Muncy, Geissler, Olds & Lowe, P.C.

(57) ABSTRACT

An aluminum strip for a component, in particular a brazing component, in particular a tube or a disk, includes a profile having a brazing connection, wherein in at least one area, in particular in the area of the brazing connection: a first part of the strip thickness is taken up by a core layer of a first aluminum alloy; at least a second part of the strip thickness is taken up by at least one plating layer of a second aluminum alloy, wherein the first and the second aluminum alloy are configured to form a "brown band" layer during a brazing process; and at least a third part of the strip thickness is taken up by at least one "brown band" layer that is formed out of the first and the second aluminum alloy during the brazing process, and wherein a strip thickness of the aluminum strip is less than 500 μm and a thickness of the core layer and/or a thickness of the plating layer is configured such that after the brazing process at least 5% of the strip thickness that is taken up by the first aluminum alloy of the core layer still remains in the at least one area, and the "brown band" layer takes up more than 20% of the strip (Continued)

thickness, and the core layer is designed to be multi-layered with one, preferably central, main core layer and at least one side core layer.

30 Claims, 6 Drawing Sheets

(51) Int. Cl.
  *C22C 21/02* (2006.01)
  *B23K 35/02* (2006.01)
  *C22C 21/00* (2006.01)
  *F28F 19/06* (2006.01)
  *F28F 21/08* (2006.01)
  *B23K 101/14* (2006.01)

(52) U.S. Cl.
  CPC .............. *C22C 21/02* (2013.01); *F28F 19/06* (2013.01); *F28F 21/084* (2013.01); *B23K 2101/14* (2018.08); *Y10T 428/12222* (2015.01)

(58) Field of Classification Search
  USPC ................. 165/133, 134.1; 428/576, 654; 228/173.4
  See application file for complete search history.

(56) References Cited

U.S. PATENT DOCUMENTS

| | | | |
|---|---|---|---|
| 5,037,707 A | 8/1991 | Fortin et al. | |
| 5,041,343 A | 8/1991 | Fortin et al. | |
| 6,019,939 A | 2/2000 | Gray et al. | |
| 6,294,272 B2 | 9/2001 | Söntgerath et al. | |
| 6,329,075 B1 * | 12/2001 | Nener et al. | 428/654 |
| 7,255,932 B1 * | 8/2007 | Kilmer | 428/654 |
| 2002/0056492 A1 | 5/2002 | Kucza et al. | |
| 2002/0142185 A1 | 10/2002 | Kilmer | |
| 2005/0011636 A1 * | 1/2005 | Miyachi et al. | 165/133 |
| 2006/0086486 A1 * | 4/2006 | Sudo | 165/143 |
| 2007/0051503 A1 | 3/2007 | Grajzl | |
| 2007/0169916 A1 | 7/2007 | Wand et al. | |
| 2008/0056931 A1 | 3/2008 | Connor et al. | |
| 2009/0123730 A1 | 5/2009 | Boger et al. | |

FOREIGN PATENT DOCUMENTS

| | | |
|---|---|---|
| CN | 1652925 A | 8/2005 |
| CN | 101004329 A | 7/2007 |
| CN | 201062927 Y | 5/2008 |
| EP | 0326337 A1 | 8/1989 |
| EP | 0327245 A1 | 8/1989 |
| EP | 0 691 898 B1 | 10/2001 |
| EP | 0 938 594 B1 | 10/2001 |
| EP | 1 339 887 B1 | 5/2004 |
| EP | 1 505 163 A2 | 2/2005 |
| EP | 1 345 728 B1 | 6/2005 |
| FR | 2 816 534 A1 | 5/2002 |
| WO | WO9423082 A1 | 10/1994 |
| WO | WO9820178 A1 | 5/1998 |
| WO | WO9422633 A1 | 2/2000 |
| WO | WO 02/40210 A2 | 5/2002 |
| WO | WO 03/089237 A1 | 10/2003 |
| WO | WO 2007/012434 A1 | 2/2007 |

* cited by examiner

MULTI-LAYERED ALUMINUM STRIP FOR BRAZING, BRAZING COMPONENT, MANUFACTURING METHOD AND HEAT EXCHANGER AND USE

This nonprovisional application is a continuation of International Application No. PCT/EP2009/065404, which was filed on Nov. 18, 2009, and which claims priority to German Patent Application No. DE 10 2008 059 450.4, which was filed in Germany on Nov. 28, 2008, and which are both herein incorporated by reference.

BACKGROUND OF THE INVENTION

Field of the Invention

The invention relates to an aluminum strip for a component, the component comprising a profile having a brazing connection, wherein the aluminum strip has a strip thickness. The invention also relates to a component made of an aluminum strip of the stated type having a strip thickness, wherein the component comprises a profile having a brazing connection. Furthermore, the invention relates to a manufacturing method for such a component, in particular a brazing component. The invention also relates to a heat exchanger and a use of the heat exchanger.

Description of the Background Art

An aluminum strip or a component, in particular a tube, of the initially stated type is used preferably to create particularly corrosion-resistant components of a heat exchanger, and/or to create a particularly corrosion-resistant heat exchanger. According to application EP 1 762 810 A2 belonging to the applicant, and which corresponds to US Publication No. US 20070051503, which is incorporated herein by reference, for example, in order to attach turbulators to flat tubes, the flat tubes are formed by a first aluminum alloy which is plated with a second aluminum alloy, wherein the combination of the alloys forms a "brown band" sacrificial layer after brazing.

Alloys for use in brazed brazing components provided with improved corrosion protection are basically known from U.S. Pat. No. 5,037,707, EP 0 691 898 B1, which corresponds to U.S. Pat. No. 6,019,939, and EP 3 263 337 B1.

For example, EP 0 691 898 B1 describes a preferred aluminum brazing alloy which results in a phase precipitate of fine Al—Mn—Cu particles. To this end, a brazed aluminum assembly comprises a core, wherein there is present on at least one side of the core a cladding of the aluminum-based brazing alloy containing silicon as the main alloying ingredient. As a result, during brazing there is present in the aluminum-based core adjacent the aluminum-based brazing alloy cladding, a band comprising a dense precipitate of particles containing Mn and Si, which band protects the aluminum-based core from corrosion.

Although it is stated in EP 0 691 898 B1 that aluminum strips of said type can be manufactured by cold rolling down to a thickness of 150 μm or lower without catastrophic loss of strength or corrosion resistance, it has been shown that, once the material thickness has been reduced, it is actually not possible to reduce the material thickness further due to the diffusion processes that occur during brazing, since silicon diffusing therein from a solder plating completely penetrates the base material during brazing. As a result, in an attack by corrosive media, the corrosion does not take place in two dimensions in a thin surface layer, but rather extends into the interior rapidly and in a targeted manner, causing premature perforation of the material of the brazing component. This effect is undesired and occurs as soon as relatively thin aluminum strip material is solder-plated on the exterior and/or the interior.

It would be desirable to attain corrosion resistance and/or improved material strengths, relatively good flow stresses and/or ductilities for relatively thin material thicknesses as well.

SUMMARY OF THE INVENTION

It is therefore an object of the invention to provide an aluminum strip, a component, in particular a brazing component, and a manufacturing method and a heat exchanger and a use of the heat exchanger, which have relatively good corrosion resistance even given relatively thin material thicknesses, and in particular have improved material strength such as increased flow stress and/or ductility, for instance.

Regarding the aluminum strip, the problem is solved by the invention using an aluminum strip of the initially stated type, in the case of which, according to the invention, in at least one area, in particular in the area of a brazing connection that is provided: a first part of the strip thickness is taken up by a core layer of a first aluminum alloy; at least a second part of the strip thickness is taken up by at least one plating layer of a second aluminum alloy, wherein the first and the second aluminum alloy are configured to form a "brown band" layer during a brazing process, and wherein a strip thickness of the aluminum strip is less than 500 μm, and a thickness of the core layer and/or a thickness of the plating layer is configured such that after the brazing process at least 5% of the strip thickness that is taken up by the first aluminum alloy of the core layer still remains in the at least one area, and the "brown band" layer takes up more than 20% of the strip thickness, and the core layer is designed to be multi-layered with one main core layer and at least one side core layer.

Preferably the core layer can be designed to be two-layered with one main core layer and one side core layer. To this end, a single main core layer can be provided with a side core layer on only one side. Preferably the main core layer, as a central main core layer, can be disposed between two side core layers.

Regarding the component, the problem is solved by the invention using a component, in particular a brazing component, of the initially stated type, in the case of which, according to the invention, in at least one area, in particular in the area of the brazing connection: a first part of the strip thickness is taken up by a core layer of a first aluminum alloy; at least a second part of the strip thickness is taken up by at least one plating layer of a remaining thickness of a second aluminum alloy, wherein the first and the second aluminum alloy are configured to form a "brown band" layer during a brazing process, and at least a third part of the strip thickness is taken up by at least one "brown band" layer formed out of the first and the second aluminum alloy during a brazing process, in particular out of the plating layer and/or core layer of an original thickness; and wherein a strip thickness of the aluminum strip is less than 500 μm, and in the at least one area, at least 5% of the strip thickness is taken up by the first aluminum alloy of the core layer, and the "brown band" layer takes up more than 20% of the strip thickness, and the core layer is designed to be multi-layered with one main core layer and at least one side core layer.

Preferably the core layer can be designed to be two-layered with one main core layer and one side core layer. Preferably the main core layer can also be disposed, as a central main core layer, between two side core layers. In both variations, a further layer can be provided, if necessary, between the one main core layer and a side core layer, and/or between a core layer and a plating layer, e.g. in the form of a diffusion barrier layer.

The invention is based on the premise that the effect of the "brown band" layer described in the prior art can be retained for smaller material thicknesses of less than 500 μm if the configuration of the layer thicknesses is advantageously adapted to the strip thickness of the aluminum strip. The invention has recognized that, given strip thicknesses of the aluminum strip less than 500 μm, a layer thickness of the "brown band" layer—which is typically in the range of a few 10 μm—takes up a significant portion of the strip thickness and must be accounted for in the effect in regards to corrosion resistance and material thickness properties such as strength and ductility. According to the inventive concept, after the brazing process, at least 5% of the strip thickness that is taken up by the first aluminum alloy of the core layer still remains in the at least one area. The thickness of the core layer and/or a thickness of the plating layer should be configured accordingly. According to the concept of the invention, this results in a brazing component in which at least 5% of the strip thickness is taken up by the first aluminum alloy of the core layer in the at least one area. Surprisingly, the invention has determined that a brown band layer also continues to inhibit corrosion resistance in these cases. In addition, according to the further finding of the invention, material thickness properties such as strength and ductility are advantageously attained when the "brown band" layer takes up more than 20% of the strip thickness.

In other words, according to the concept of the invention, a layer thickness of the "brown band" layer and of the core layer—in a carefully coordinated manner—results in a greatly improved material property in regard to corrosion resistance and material thickness even given relatively thin strip thicknesses. This applies in general to strip thicknesses less than 500 μm. In particular, the stated advantages can also be attained with strip thicknesses less than 400 μm and, in particular, less than 300 μm. The properties can also be detected at strip thicknesses less than 250 μm, advantageously less than 200 μm, and in particular less than 150 μm. In trials it has been shown that the disadvantageous properties of through-corrosion, which occur in the prior art, do not occur when a brown band layer does not take up more than 95% of the strip thickness, in particular not more than 80% of the strip thickness. Preferably the concept according to the invention results in an aluminum strip and a brazing component in which at least 10%, in particular at least 20%, in particular up to 40% or 50% of the strip thickness that is taken up by the first aluminum alloy of the core layer still remains. Likewise, a configuration of the material thickness is particularly advantageous when the "brown band" layer takes up more than 30%, in particular more than 40% of the strip thickness.

Advantageous developments of the invention are presented in the dependent claims and indicate specific advantageous ways to embody the above-described concept within the scope of the statement of the problem, and in regard to other advantages.

Within the scope of a particularly preferred development it has been shown that particularly good results in regard to corrosion resistance and material thickness, such as strength and flow stress, are attained when preferably between 40% to 50% of the strip thickness taken up by the first aluminum alloy of the core layer remains when an aluminum strip according to the concept of the invention is brazed.

To this end it has proven particularly advantageous for the plating layer and/or the core layer to be configured to support the formation of the "brown band" layer, i.e. the plating layer and the core layer should support the "brown band" formation. Given very thin material thicknesses, it is advantageous to configure a main core layer such that the formation of the brown band layer is inhibited.

An aluminum alloy from the 4000 series (AA4XXX) has proven particularly advantageous for the second aluminum alloy of the plating layer. Aluminum alloys AA4343, AA4045 or AA4047 and AA4004 or AA4104, including modifications of these alloys, have proven suitable, for instance. A particularly high silicon portion in such alloys of 0.6% to 21.5% silicon reduces the melting point of the alloy and makes the molten material runnier. For instance, a silicon portion in particular between 0.6% and 21.5%, in particular between 6% and 15% or between 6% and 12%, has proven advantageous—the latter are silicon portions in the range of the eutectic in particular. Alternatively, the Al—Si solder and/or the silicon can also be applied as powder, e.g. in the form of Sil Flux as described in U.S. Pat. No. 5,232,788. In addition or as an alternative thereto, the AlSi solder can also be applied by flame-spraying, electroplating, or using other suitable methods.

An aluminum alloy containing substantial portions of Mn and/or Mg has proven advantageous for a first aluminum alloy of the core layer. For instance, the first aluminum alloy of the core layer, in particular the main core layer, is an aluminum alloy of the 3000 series (AA3XXX) or the 5000 series (AA5XXX) or the 6000 series (AA6XXX) in particular. The aluminum alloys in the 3000 series have particularly advantageous corrosion resistance, while the alloys in the 5000 series and the 6000 series have particularly high strengths due to their greater portions of manganese and/or magnesium.

Within the scope of a particularly preferred development of the invention, it is provided that the core layer has a smaller portion of silicon than does the plating layer. This results in a fundamentally desired diffusion behavior of the silicon in the brazing process to form the brown band layer. After the brazing process, a plating layer having a residual thickness therefore remains, while the brown band layer is formed of the plating layer having an original thickness and—preferably to a much lower extent—of the core layer having an original thickness.

Moreover, it has proven advantageous within the scope of a particularly preferred development for the core layer to have a multi-layered design with one, preferably central, main core layer and at least one side core layer. It has proven particularly advantageous for the main core layer and the side core layer to each contain a smaller portion of silicon than does the plating layer, and for the main core layer to have a greater portion of silicon than does the side core layer. Since the silicon portion in the main core layer is greater than that of the side core layer, the diffusion of silicon is halted. In a particularly advantageous manner, the general trend of through-diffusion of the silicon out of the plating layer is counteracted even given low strip thicknesses of the aluminum strip, in fact due to the greater, diffusion-inhibiting portion of silicon in the main core layer. Advantageously, the main core layer contains a relatively low Fe portion and/or a relatively high Cu portion. Advantageously, the Fe portion of the main core layer is at least 0.1% less than in the side core layer, and/or the Cu portion of the main core layer is 0.1% greater than in the side core layer. The aforementioned development therefore provides a particularly advantageous additional measure which, according to the concept of the invention, results in at least 5% of the strip thickness taken up by the first aluminum alloy of the core layer remaining in the at least one area after the brazing process.

Within the scope of another particularly preferred development of the invention, a first aluminum alloy of the core layer with portions of silicon between 0% and 0.4%, in particular between 0% and 0.25%, in particular portions of silicon between 0% and 0.15% or 0.1% and 0.25%, has proven effective. Within the scope of the aforementioned development, this aluminum alloy has also proven to be preferable in the main core layer. For example, a main core layer could have a silicon portion of 0.15%, while a preferably central main core layer could have a silicon portion of 0.25%.

Moreover, the first aluminum alloy of the core layer preferably contains at least the following portions:
Si 0-0.4%, in particular 0-0.25%, in particular 0-0.15%, preferably 0.1-0.25%;
Fe 0-0.8%, in particular 0-0.15%, in particular 0-0.08%, preferably 0.05-0.15%;
Cu 0.1-1.0%, in particular 0.4-0.8%;
Mn 0.5-2.5%, in particular 0.7-1.5%.

A higher Mn portion in the core layer results in relatively great strength after brazing.

In addition, it has proven particularly advantageous for the first aluminum alloy of the core layer to also contain the following portions:
Mg<0.8%, in particular <0.6%
Ti<0.2%, in particular <0.1%

In addition, it has proven particularly advantageous for the first aluminum alloy of the core layer to also contain the following portions:
Cr, Zr, V, Zn<0.05%
Sn, Sr, Sc<0.005%.

Regarding the brazing component, it has proven particularly advantageous for the brown band layer to take up more than 30%, preferably more than 40% of the strip thickness. As recognized in the scope of this development, a brown band layer having this thickness particularly preferably results in a strength of the brazing component being retained or increased, particularly preferably, in addition to the advantageous corrosion resistance.

Regarding the corrosion resistance, it has also proven particularly advantageous for the core layer to have greater electropositivity than the brown band layer. In particular it is advantageous for the core layer to be more electropositive than the brown band layer by at least 5 mV, preferably at least 10 mV.

A particularly advantageous effect in regard to corrosion resistance and material strength is attained when the core layer takes up at least between 50% to 80% of the total thickness of the core layer and brown band layer combined.

Within the scope of a preferred first variant development of the invention, it has also proven advantageous for the second aluminum alloy of the plating layer and/or a further layer to be formed of a further aluminum alloy with a portion of Zn greater than 0.2%, in particular greater than 0.5%, in particular greater than 1%, on at least one side of the core layer. This variant has proven particularly preferable for the case in which the brazing component is formed as a tube. Advantageously, the plating layer provided with a higher zinc portion, and/or the additional layer are disposed on the side of the core layer through which fluid flows.

Within the scope of a particularly preferred, second variant development of the invention, a further layer composed of pure aluminum is formed on at least one side of the core layer. As with the first variant, this is advantageous in the case of a tube, mainly on the side of the core layer through which fluid flows. An aluminum alloy of the 1000 series has proven particularly preferable. For example, an AA1050 aluminum alloy or an AA1100 aluminum alloy have proven advantageous.

Within the scope of developments, the concept of the invention can basically be embodied, in the case of a brazing component, in the form of various layer configurations and plating configurations, such as applying a plating layer onto a core layer on one side or two sides.

Moreover, within the scope of developments, the concept of the invention can be applied advantageously on highly diverse brazing components, such as installing flow guidance elements to flow channels of a heat exchanger or tubes, in particular flat tubes or disks of a heat exchanger.

The concept of the invention also relates to a manufacturing method for a brazing component according to the concept of the invention or according to one of the developments, comprising the steps: reshape a tubular strip, in particular using a curving process and/or a folding process and/or a bending process in which a closed profile is formed; braze in, the at least one area and thereby form the intended brazing connection in the area; form a "brown band" layer out of the first and the second aluminum alloy during a brazing process; wherein configure a thickness of the core layer and/or a thickness of the plating layer such that, after the brazing process, at least 5% of the strip thickness that is taken up by the first aluminum alloy of the core layer still remains in the at least one area, in particular in the area of the brazing connection, and the "brown band" layer takes up more than 20% of the strip thickness, and the core layer is designed with one, preferably central, main core layer (1.1, 10.1) and at least one side core layer (1.2, 1.3).

The concept of the invention also relates to a heat exchanger, in particular heater cores or coolant radiators or exhaust-gas and/or charge-air heat exchangers, to exchange heat between a first fluid, in particular air, an exhaust gas and/or charge air, and a second fluid, in particular a coolant, comprising: a block for guiding the first and the second fluid such that they are separated from one another and exchange heat, comprising a number of flow channels through which the first fluid can flow; a first chamber which accommodates the flow channels and through which the second fluid can flow a housing in which the chamber and the flow channels are disposed; wherein, according to the invention, at least one component is in the form of a brazing component according to the concept of the invention.

The concept of the invention furthermore relates to the use of the heat exchanger of the aforementioned type as heater core or evaporator or coolant radiator or oil cooling system or condenser or exhaust-gas and/or charge-air heat exchanger for cooling exhaust gas and/or charge air in an exhaust-gas recirculation system and/or charge-air supply system of an internal combustion engine of a motor vehicle.

BRIEF DESCRIPTION OF THE DRAWINGS

Embodiments of the invention are explained in the following with reference to the drawing. It is not intended for the embodiments to necessarily be depicted literally; instead, the drawing is presented in a schematized and/or slightly distorted form as necessary for purposes of explanation. Reference is made to the relevant prior art in regard to supplements to teachings that are not immediately clear from the drawing. It should be noted that various modifications and changes related to the form and detail of an embodiment can be made without deviating from the general idea of the invention. The features of the invention disclosed in the description, the drawing, and the claims can be essential to the development of the invention individually or in any combination. All combinations of at least two of the features disclosed in the description, the drawing, and/or claims also fall within the scope of the invention. The general idea of the invention is not limited to the exact form or the detail of the preferred embodiment shown and described in the following, nor is it limited to a subject matter that would be limited compared to the subject matter claimed in the claims. In the case of measurement ranges that are indicated, values located within the stated limits are also intended to be disclosed, and they can be applied and claimed arbitrarily, and wherein:

DETAILED DESCRIPTION

Figure 1A:
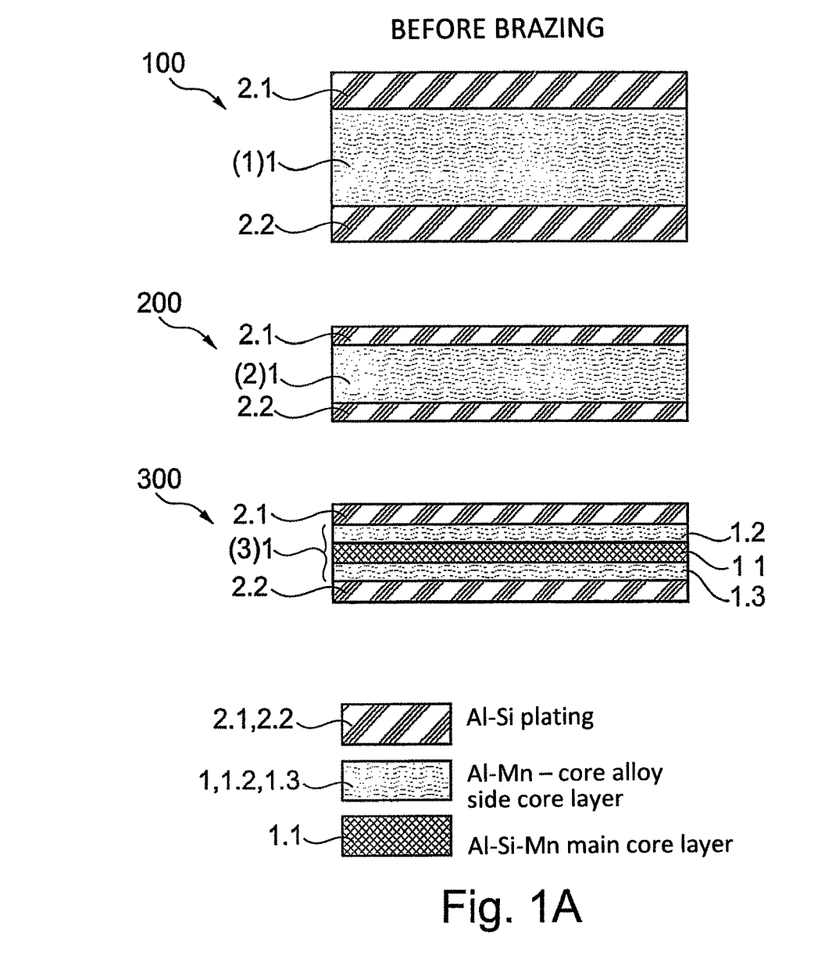
FIG. 1: shows, in view (A), three preferred embodiments (1), (2), (3) of an aluminum strip 100, 200, 300 before brazing, with schematically depicted layer configuration, and correspondingly in view (B), three preferred embodiments (1), (2), (3) of a resulting brazing component 100', 200', 300'.
Figure 1B:
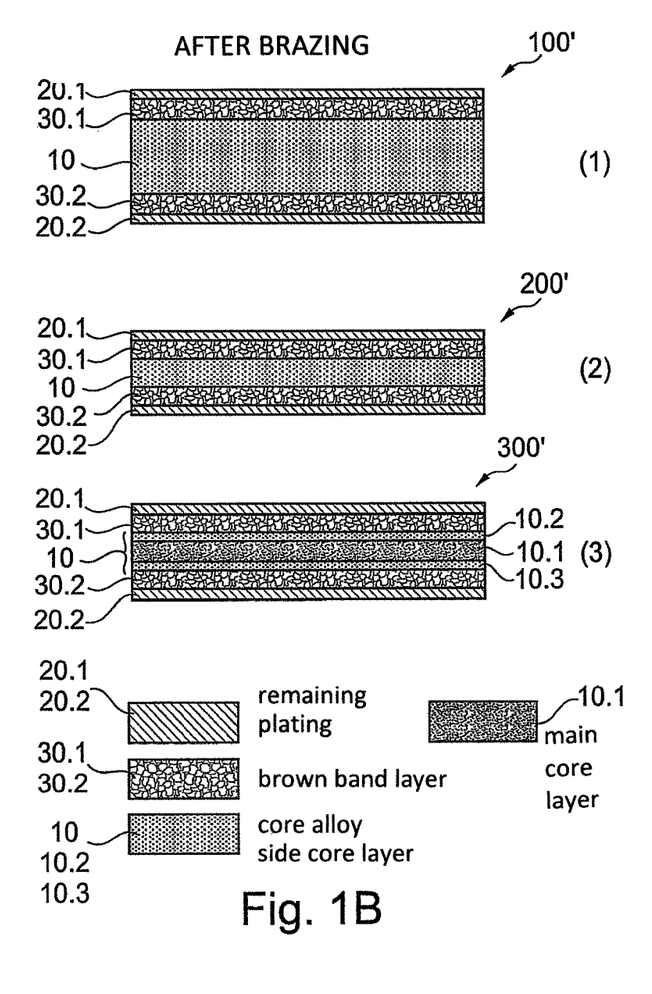

FIG. 1 shows three embodiments of an aluminum strip and an associated brazing component produced by brazing the aluminum strip.

Identical parts or features or parts or features having the same function are labelled with the same reference characters below, for simplicity.

Figure 6:
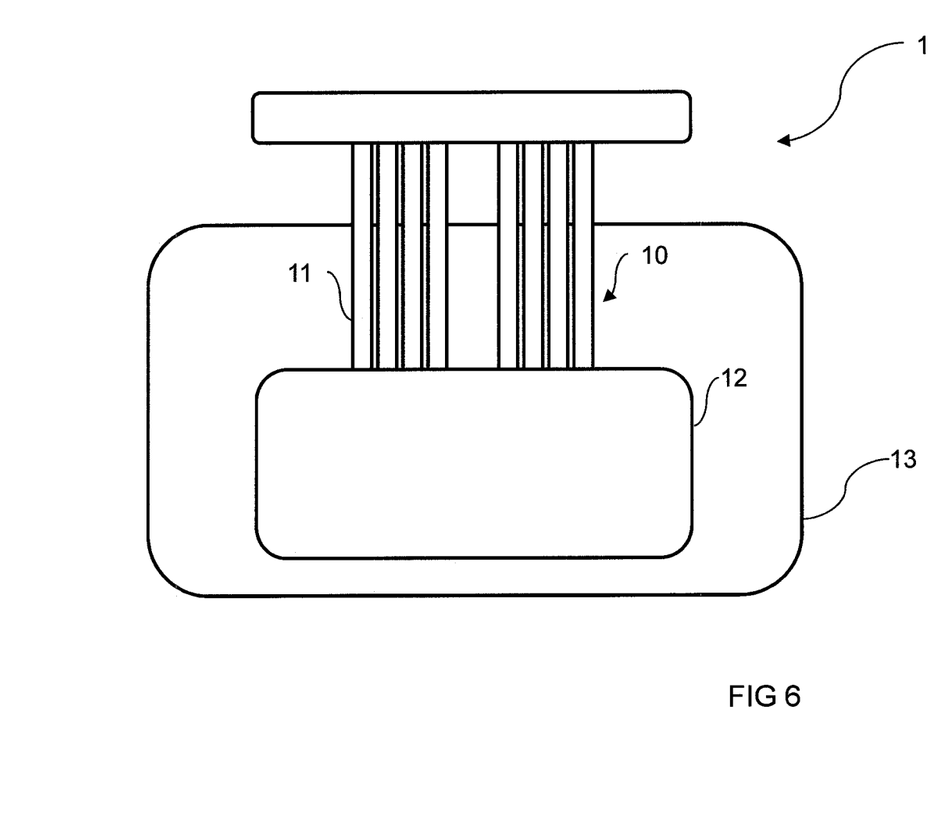
FIG. 6: shows a heat exchanger according to an embodiment of the present application.

As shown in FIG. 6, a heat exchanger 1, such as an exhaust-gas and/or charge-air heat exchanger, exchanges heat between a first fluid, such as an exhaust gas and/or charge air, and a second fluid, such as a coolant. The heat exchanger includes a block 10 for guiding the first fluid and the second fluid such that they are separated from one another and exchange heat. The block 10 includes a number of flow channels 11 through which the first fluid can flow; a first chamber 12 which accommodates the flow channels 11 and through which the second fluid can flow; and a housing 13 in which the chamber and the flow channels are disposed. The flow channel 11 is in the form of a tube and is formed as a brazing component according to the present application. The heat exchanger 1 may be installed in a heater core or evaporator or coolant radiator or oil cooling system or condenser or exhaust-gas and/or charge-air heat exchanger for cooling exhaust gas and/or charge air in an exhaust-gas recirculation system and/or charge-air supply system of an internal combustion engine of a motor vehicle.

View (B) of FIG. 1 shows, in embodiments (1), (2) and (3), a brazed component 100', 200', 300' obtained by a brazing process carried out on aluminum strip 100, 200, 300 according to embodiments (1), (2), and (3) shown in view (A) in FIG. 1. It is clear that a layer with leftover solder remains after each brazing process, i.e. a plating layer 20.1, 20.2 of a remaining thickness with a second aluminum alloy, and a core layer 10 of a remaining thickness with a first aluminum alloy. Between a core layer 10 and a leftover solder layer, i.e. plating layer 20.1, 20.2 of the remaining thickness, a brown band layer 30.1, 30.2 has formed during the brazing process via diffusion of Si out of plating layer 20.1, 20.2, which has relatively high corrosion resistance in accordance with the initially described advantages and as illustrated in detail in EP 0 691 898. According to the concept of the invention, it is ensured in the case of the relatively thin material thicknesses used here, of 370 μm in embodiment (1) and 260 μm in embodiment (2), that an area of at least 5% of the entire strip thickness taken up by the first aluminum alloy of core layer 10 remains after the brazing process.

In one variant, the layer sequence of embodiments (1), (2) and (3) can be embodied on one side, i.e. not as a sandwich structure, that is, possibly without a further plating layer 2.2, 20.2 and without further side core layer 1.3, 10.3.

However, although the brown band layer has been described to date in the prior art merely as a sacrificial layer for inhibiting corrosion, the concept of the present invention has recognized that brown band layer 30.1, 30.2 can also be used to improve the strength of the brazing component, even given relatively thin material thicknesses in the present case. To this end, brown band layer 30.1, 30.2 in this case is formed with a significant portion of more than 30% to 40% of the total thickness of brazing component 100', 200', 300'.

An aluminum strip 100, 200, 300 of embodiments (1), (2), (3) shown in view (A) in FIG. 1 can basically be created in a conventional manner by cold rolling or hot rolling, and can be plated, e.g. using procedures of the type described in U.S. Pat. No. 5,037,707, EP 0 326 337 or EP 0 691 898. It can also be created using modern methods such as a simultaneous casting method, in which core layer and plating layer are cast simultaneously.

In the present case, within the scope of the embodiment shown here, the aluminum strip is hot rolled and, after stripping, is plated without the need to perform another homogenization step. The hot rolling is carried out at temperatures between 560° C. and 450° C. or possibly at temperatures as low as 440° C. Tempering or annealing during the cold rolling step is preferably avoided in this case, except for alloys having a relatively high Cu portion, in which case tempering or annealing can take place at approximately 220° C. to 480° C.

In the prior art such as U.S. Pat. No. 5,037,707, EP 0 326 337 or EP 0 691 898, alloys are basically indicated that can be used in a core layer 1 or plating layer 2.1, 2.2 in a suitable manner. The alloys of the core layer indicated in the prior art have a relatively low portion of silicon and iron in order to best support the controlled formation of a brown band layer during the brazing process. The alloys indicated in U.S. Pat. No. 5,037,707, EP 0 326 337 and EP 0 691 898 are basically proven to be suitable even within the scope of the general concept of the present invention, and the disclosure of the stated documents is hereby incorporated into the disclosure of the present application. However, in a further-reaching development of the concept of the invention, it was recognized that a brown band layer 30.1, 30.2—which was previously treated only as a sacrificial layer—should be configured relatively well specifically for the case of a particularly long-lived corrosion resistance and when used with relatively thin material thicknesses, i.e. it should take up more than 20% of the strip thickness, wherein at least 5% of the strip thickness taken up by the aluminum alloy of the core layer still remains, however, in the area of the brazing connection after the brazing process.

Within the scope of the present embodiment, the alloy of core layer 1 has the following portions: Si 0-0.4%, Fe 0-0.8%, Cu 0.1-1.0%, in particular 0.4-0.8%, Mn 0.5-2.5%, Mg<0.8%, Ti<0.2%, Cr, Zr, V, Zn<0.05% and Sn, Sr, Sc<0.005%.

It should be noted that Fe portions of up to 0.15% and silicon portions up to 0.25% are definitely desired to ensure relatively good formation of the brown band layer. Nevertheless, Si portions between 0.1 and 0.15% and Fe portions between 0.5 and 0.08% are particularly preferred.

A Cu portion is used in a particularly advantageous manner to increase strength, and can be between 0.1 and 1.0%. A Cu portion between 0.4 and 0.8% is particularly preferred. Given a Cu portion less than 0.4%, the strength-increasing effect is not particularly pronounced; above a Cu portion of 0.8% the trend to form intermetallic phases is relatively high, which is still not yet optimal in rolling processes for thin material layers that are present within the scope of the concept of the invention. Materials that refine particle sizes, such as Cr, Zr, V, Sn, Sr, Sc, are practically not present, or are present only in smaller quantities. It was recognized that such elements should be avoided, because they make the recycling process—or the like—difficult. In contrast, materials such as Mn for improving brazeability, Mg for improving strength, and particle size-influencing materials such as Ti are desired according to the present embodiment according to the concept of the invention.

According to the present embodiments, an alloy of the plating layer 2.1, 2.2 contains an Si portion between 7.5 and 15%. The Si portion in the plating layer, which is substantially higher compared to that of the core layer, results in diffusion of Si into the core layer and in the formation of a particularly advantageous brown band given thinner material thicknesses according to the concept of the invention. In the present case, there is an AA4045 aluminum alloy in the plating layer in embodiment (1), and an AA4343 aluminum alloy in the plating layer in embodiments (2) and (3).

Figure 4:
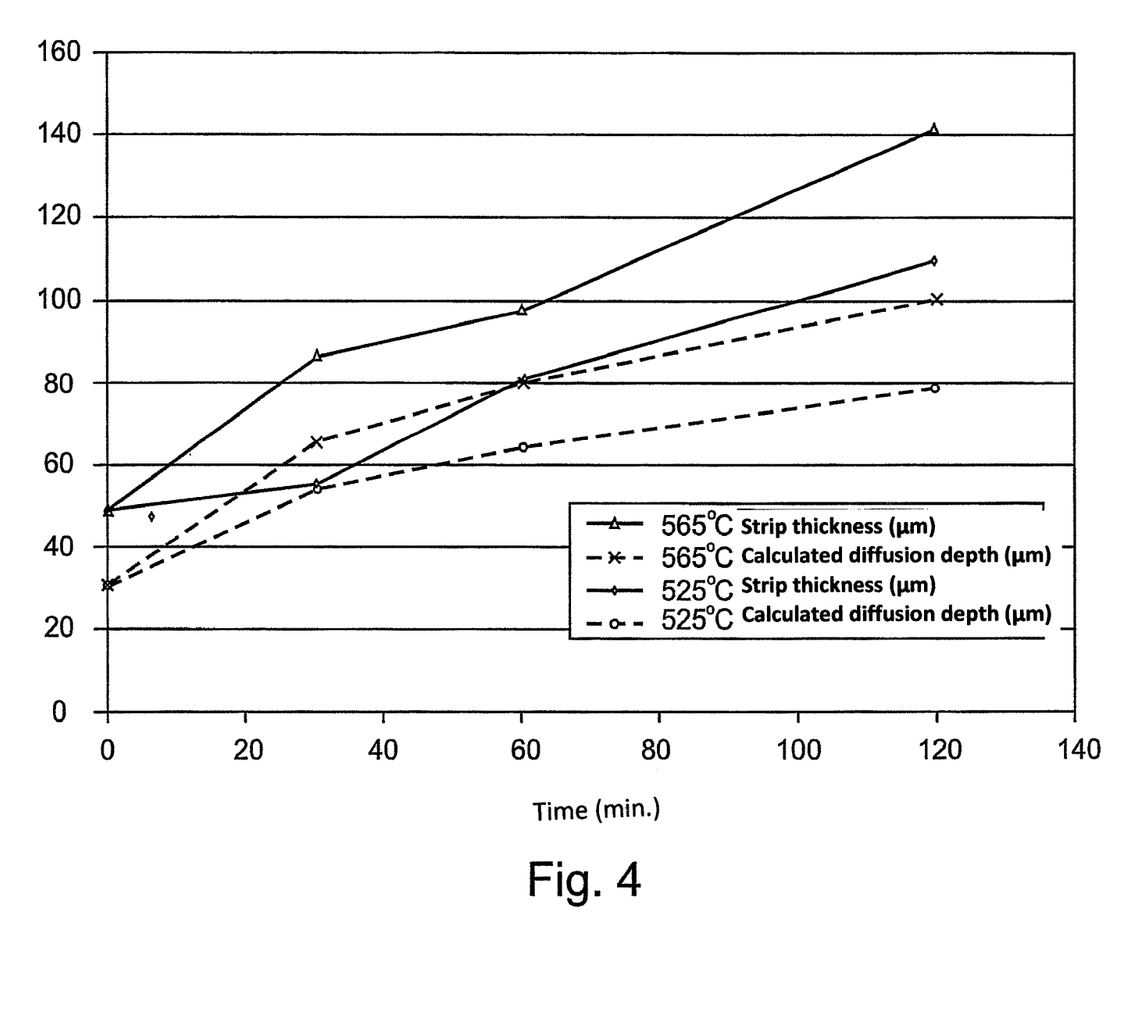
FIG. 4: shows silicon diffusion depths compared to measured brown band layer thicknesses as brazing time increases, which confirms the experimental trend shown in FIG. 3.

In embodiment (1), an aluminum strip 100 with plating having a total thickness of 370 μm is formed, and in embodiments (2) and (3) an aluminum strip having a total thickness of 260 μm is formed—view (A) in FIG. 4.

To this end, FIG. 1 shows embodiments (1) and (2), each of which has a core layer 1 and a plating layer 2.1 and 2.2 on either side in the present case. Core layer 1 comprises an aluminum alloy of the above-described type. The plating layer comprises an aluminum alloy as described above.

In embodiment (3), core layer 1 is designed to be multi-layered with one main core layer 1.1 and side core layers 1.2, 1.3 disposed on either side of the main core layer.

The third embodiment (3) has proven to be particularly preferred in cases of relatively thin material thicknesses. Main core layer 1.1 and 10.1 can therefore be directly adjacent to a brown band layer 30.1, 30.2—view (B) of FIG. 1—formed in the brazing process, and can be clearly separated from the plating layer, i.e. separated from side core layers 1.2 and 1.3, and 10.2 and 10.3. The alloy of main core layer 1.1, 10.1 is formed by an alloy in the present case that is practically unsuitable for forming a brown band layer, or that clearly inhibits the formation of a brown band layer. Accordingly, it has proven particularly preferable to design the present central intermediate core layer 1.1, 10.1 to be more electropositive than brown band layer 30.1, 30.2, by at least 5 mV, in particular more electropositive by 10 mV in the present case. In a particularly preferred embodiment, this is achieved by using a greater Cu portion in the main core layer than in the side core layer, advantageously a Cu portion that is at least 0.1% greater. In a modification, a further layer, e.g. a diffusion barrier layer, can also be disposed between main core layer 1.1, 10.1 and side core layer 2.1, 20.1 or 2.2, 20.2 and/or between core layer 1, 10 and plating layer 2, 20.

Regarding the aluminum alloy to be used, main core layer 1.1, 10.1 is not as critical as the configuration of side core layer 1.2, 1.3 and 10.2, 10.3 provided the aluminum alloy of main core layer 1.1, 10.1 is suitable for preventing or at least inhibiting the formation of a brown band layer. In particular, the Fe portions of an aluminum alloy of main core layer 1.1, 10.1 are very small or not present. Aluminum alloys of the 3000 series (AA3xxx), the 5000 series (AA5xxx), or the 6000 series (AA6xxx) are particularly suitable.

It has been shown that, due to the above-described use of the preferred aluminum alloy in core layer 1 and the silicon-rich alloy options in plating layer 2.1, 2.2, an alloy composition forms in brown band layer 30.1, 30.2, which is equally advantageous for attaining corrosion resistance and strength of the material. The diffusion of Si into brown band layer 30.1, 30.2 can contribute thereto in particular. According to the concept of the invention, a Mn portion in the range of 0.5 to 2.5% is provided in the first aluminum alloy of core layer 1 in the present embodiment. Through-corrosion is prevented, since the configuration of the thickness of core layer 1 and plating layer 2.1, 2.2 in aluminum strip 100, 200, 300 prevents a brown band layer from extending entirely through the material of brazing component 100', 200', 300'. This becomes particularly significant given the relatively thin thickness of 260 μm of brazing components 200', 300' in embodiments (2) and (3). Given such thin material thicknesses or thinner material thickness below 200 μm or below 150 μm, the risk of a brown band layer extending through the entire material thickness is effectively prevented by providing a brazing component 300' according to embodiment (3), which is obtained from an aluminum strip 300 as shown in the view in FIG. 1. As explained, the main core layer in the present embodiment (3) preferably comprises an Al—Si—Mn alloy which effectively inhibits any progression of a brown band layer.

The properties of the samples shown in embodiments (1) and (2) are described in the following with reference to FIG. 2 to FIG. 5.

Figure 2A:
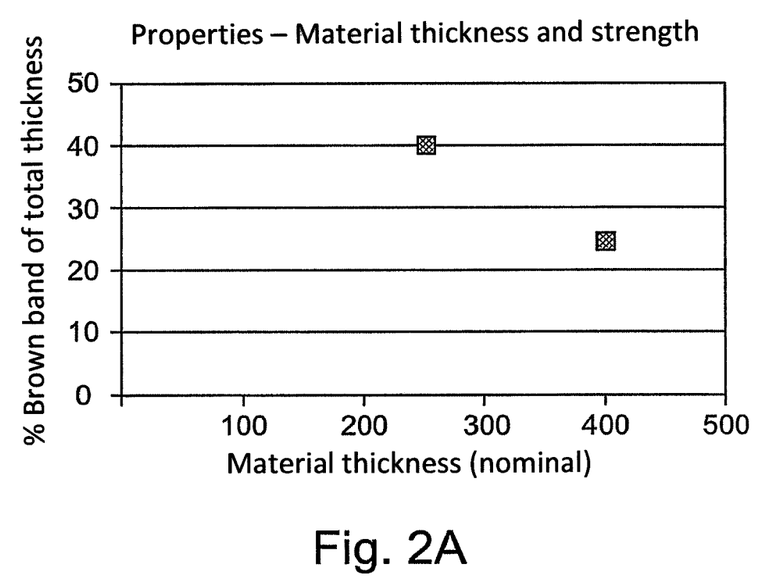
FIG. 2: shows, in view (A), material properties of two samples of the embodiments (1), (2) in regard to brown band layer portion of the total thickness and, in view (B), strength of the samples after brazing, with respect to the brown band layer portion of the total thickness.
Figure 2B:
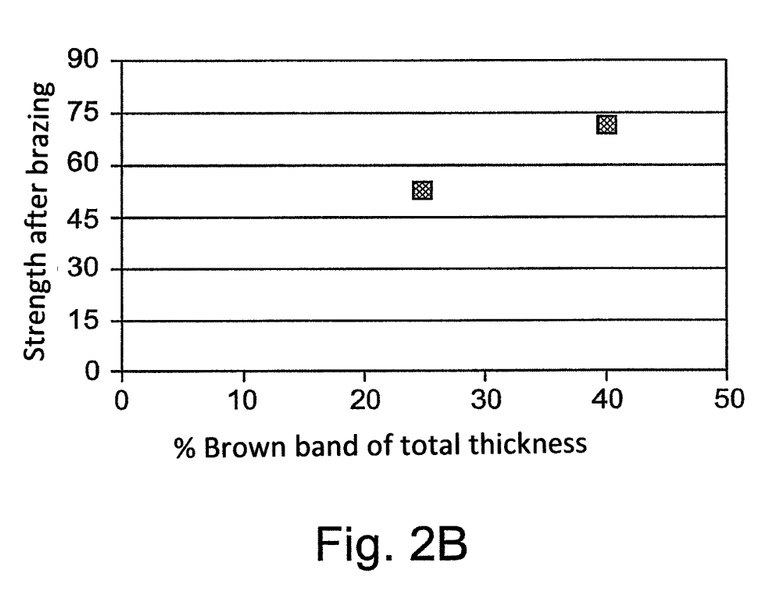

FIG. 2 shows, in view (A), that the portion of brown band layer 30.1, 30.2 in the total material thickness of brazing component 100', 200' is approximately 25% to 40% in the present case. In view (B) in FIG. 2, it is shown that the strength is much higher after brazing given a higher percentage of the brown band layer to the total thickness, and otherwise increased strength is expected after brazing—compared to the results from the prior art—even given a smaller percentage of the brown band layer relative to the total thickness.

Figure 3:
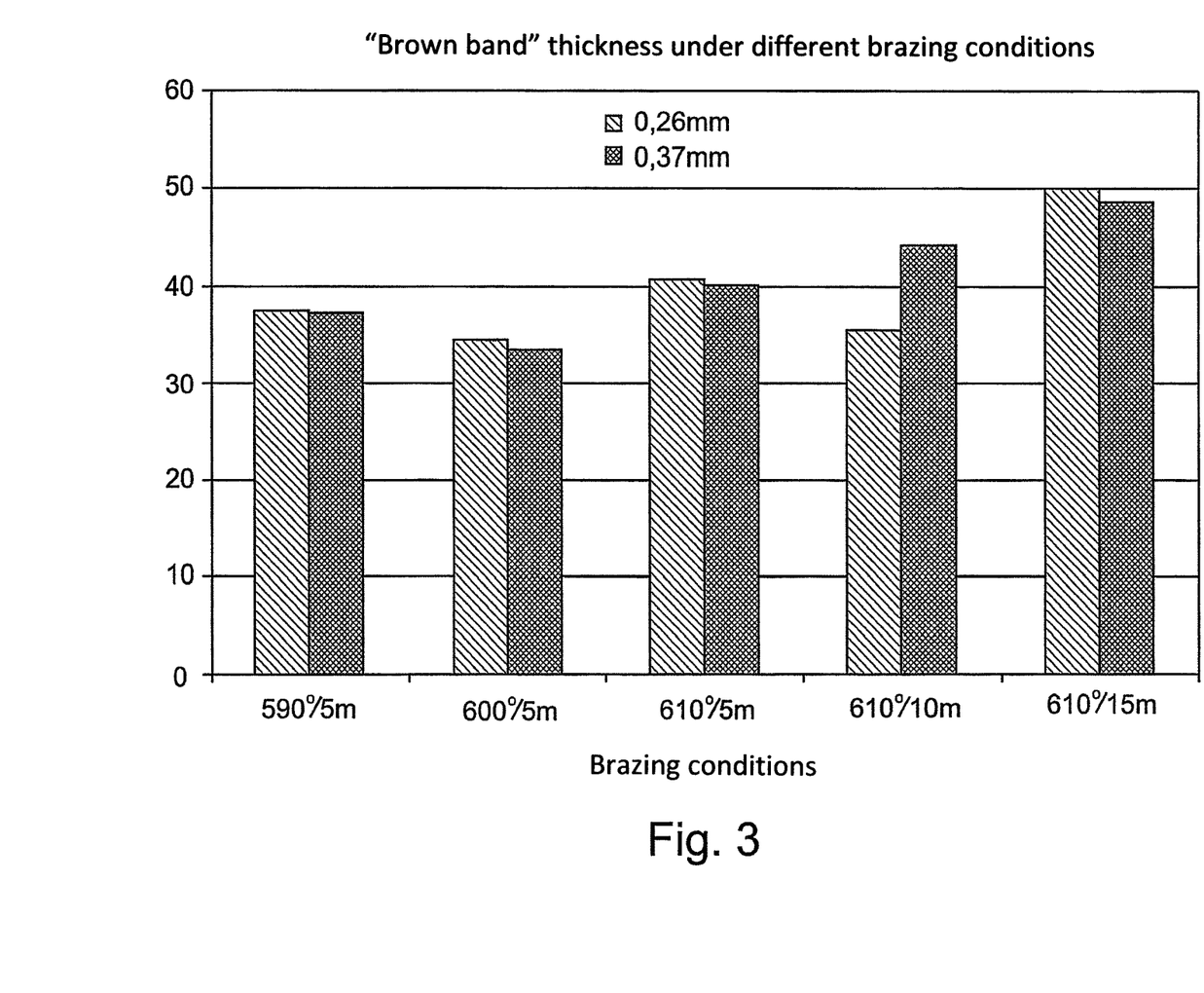
FIG. 3: shows measurements, as examples, of brown band layer thicknesses conducted on samples of embodiments (1), (2) under different brazing conditions, which show that the brown band layer thickness advantageously increases as the brazing temperature and brazing time increase.

The samples shown in embodiment (1) and embodiment (2) were subjected to a brazing process at temperatures between 590° C., 600° C., and 610° C. for different time periods of 5 minutes, 10 minutes, or 15 minutes. The results, as shown in FIG. 3, show that—despite the scatter—the thickness of a brown band layer 30.1, 30.2 increases as the brazing temperature increases and the brazing time increases. This is in agreement with the theoretical calculations of an Si diffusion rate shown in FIG. 4, which is shown in comparison to the measured band thicknesses of brown band layer 30.1, 30.2.

Figure 5:
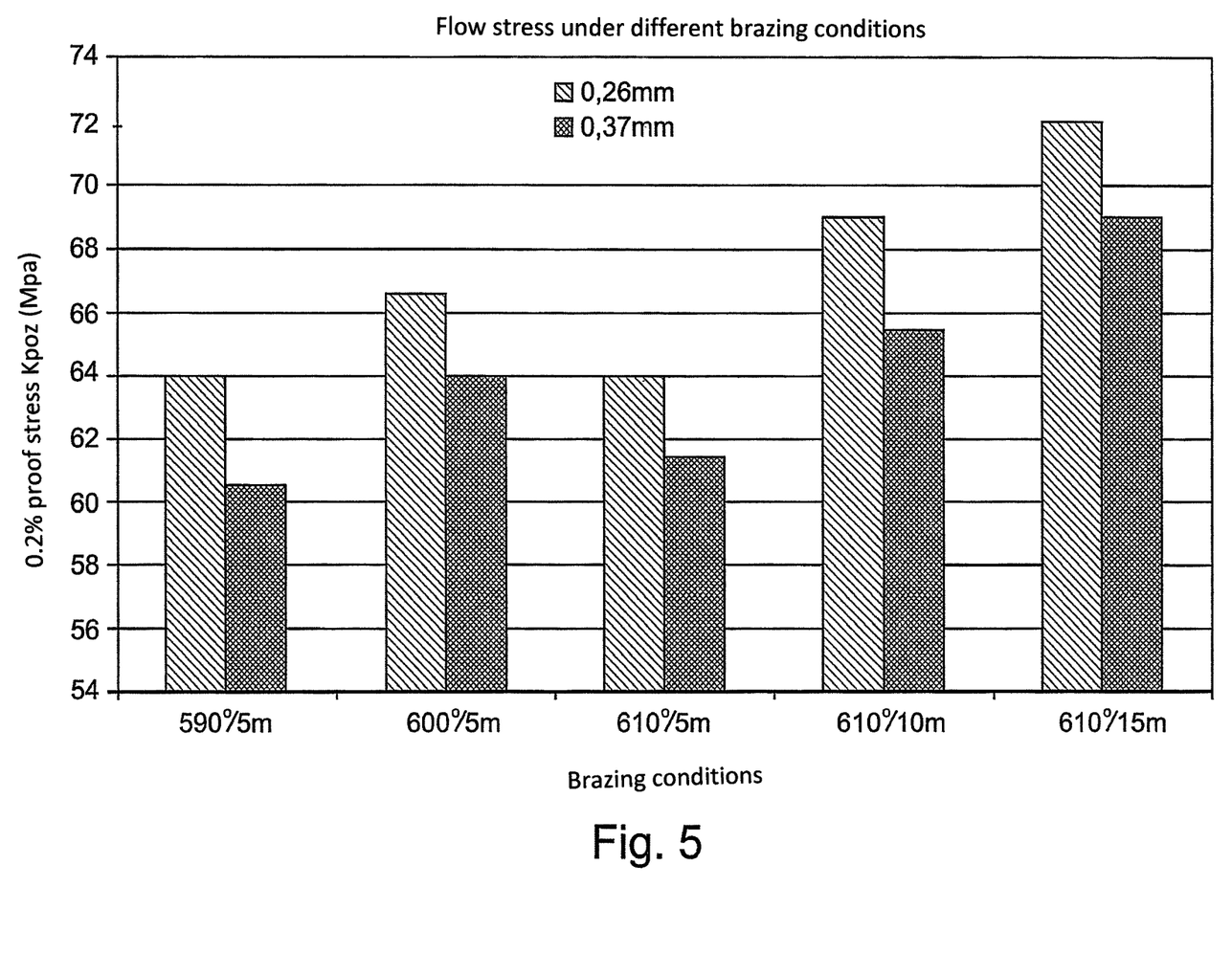
FIG. 5: shows proof stress measurement results at different brazing temperatures and brazing times, which show that, as the thickness of the brown band layer increases, higher flow stresses of the material according to the concept of the invention are attained.

FIG. 5 shows the measurement results for the flow stress given the brazing conditions explained with reference to FIG. 3. Specifically, the 0.2% proof stress $R_{p\ 0.2}$ is measured in MPa. It is clear that the flow stress increases as the brazing temperature increases and the brazing time increases. This is due to the increase in thickness of brown band layer 30.1, 30.2 explained with reference to FIG. 3 and FIG. 4.

Moreover, the effect of an increase in strength by brown band layer 30.1, 30.2 was confirmed experimentally in a further measurement. Two series of samples were prepared for this purpose. One sample was provided with a conventional AA3003 aluminum alloy which prevents the formation of a brown band layer, and was plated on both sides with an AA4xxx aluminum alloy. The thickness of the plating was varied between 5 and 10% of the total material thickness. The second series of samples was prepared using the same plating and configuration of a core layer, which is basically suitable for forming a brown band layer according to the concept of the invention, however. Both sample series were subjected to identical brazing procedures and subsequent strength measurements. The thickness of the brown band layer in the second sample series was measured just as it was in the first sample series. The result of the measurement was that a brown band practically did not form at all in the first sample series using the AA3003 aluminum alloy, while the sample series according to the concept of the invention exhibited formation of a brown band with clearly increased strength values for the total composite material.

In summary, the invention relates to an aluminum strip for a brazing component, and a brazing component, in particular a tube, said brazing component comprising a profile with a brazing connection, wherein, in at least one area, in particular in the area of the brazing connection: a first part of the strip thickness is taken up by a core layer 1, 10 of a first aluminum alloy; at least a second part of the strip thickness is taken up by at least one plating layer 2.1, 2.2, 20.1, 20.2 of a second aluminum alloy, wherein the first and the second aluminum alloy are configured to form a "brown band" layer 30.1, 30.2 during a brazing process, and at least a third part of the strip thickness is taken up by at least one "brown band" layer formed out of the first and the second aluminum alloy during a brazing process, and wherein a strip thickness of the aluminum strip 100, 200, 300 is less than 500 μm, and a thickness of the core layer 1, 10 and/or a thickness of the plating layer 2.1, 2.2, 20.1, 20.2 is configured such that after the brazing process at least 5% of the strip thickness that is taken up by the first aluminum alloy of the core layer 1, 10 still remains in the at least one area, and the "brown band" layer 30.1, 30.2 takes up more than 20% of the strip thickness, and the core layer (1, 10) is designed to be multi-layered with one, preferably central, main core layer (1.1, 10.1) and at least one side core layer (1.2).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An aluminum strip for a brazing component, a tube or a disk, the component comprising:
    a profile having a brazing connection, wherein the aluminum strip has a strip thickness and, in at least one area or in the area of the brazing connection:
        a first part of the strip thickness is taken up by a core layer of a first aluminum alloy;
        at least a second part of the strip thickness is taken up by at least one plating layer of a second aluminum alloy; and
        a brown band layer formed from the first aluminum alloy layer and the second aluminum alloy layer during a brazing process,
    wherein a strip thickness of the aluminum strip is less than 500 μm and a thickness of the core layer and/or a thickness of the plating layer is configured such that after the brazing process at least 5% of the strip thickness that is taken up by the first aluminum alloy of the core layer still remains in the at least one area, and such that the brown band layer takes up more than 20% of the strip thickness,
    wherein the core layer is configured to be multi-layered with one central main core layer and at least one side core layer,
    wherein the brown band layer is formed between the at least one plating layer and the at least one side core layer and directly contacts the at least one plating layer,
    wherein the core layer is more electropositive than the brown band layer,
    wherein the main core layer and the at least one side core layer have a smaller portion of Si than the at least one plating layer, and the main core layer has a greater Si portion than the at least one side core layer, and
    wherein the brown band layer comprises the side core layer infused with silicon and having an original thickness before brazing.

2. The aluminum strip according to claim 1, wherein the strip thickness is less than 400 μm, less than 300 μm, less than 250 μm, less than 200 μm, or less than 150 μm.

3. The aluminum strip according to claim 1, wherein at least 10%, at least 20%, or between 40% to 50% of the strip thickness taken up by the first aluminum alloy of the core layer remains after the brazing process.

4. The aluminum strip according to claim 1, wherein the thickness of the core layer and/or the thickness of the plating layer is configured such that the brown band layer takes up more than 20%, or more than 30% of the strip thickness.

5. The aluminum strip according to claim 1, wherein the plating layer and/or the core layer is configured to support the formation of the brown band layer.

6. The aluminum strip according to claim 1, wherein the second aluminum alloy of the plating layer is an aluminum alloy of the 4000 series (AA4xxx), or an AA4343, or an AA4045, or an AA4047, or an AA4004, or an AA4104 aluminum alloy.

7. The aluminum strip according to claim 1, wherein the second aluminum alloy of the plating layer is formed with portions of Si between 0.6% and 21%, with portions of Si between 6% and 15%, or with portions of Si between 6% and 12%.

8. The aluminum strip according to claim 1, wherein the plating layer and the core layer is configured to support the formation of the brown band layer.

9. The aluminum strip according to claim 1, wherein the main core layer is configured to inhibit the formation of the brown band layer.

10. The aluminum strip according to claim 1, wherein the main core layer has a lower portion of Fe than does a side core layer.

11. The aluminum strip according to claim 1, wherein the first aluminum alloy of the core layer is an aluminum alloy having Mn and/or Mg, or the first aluminum alloy of the core layer is an aluminum alloy of the 3000 series (AA3xxx) and/or the 5000 series (AA5xxx), and/or the 6000 series (AA6xxx).

12. The aluminum strip according to claim 1, wherein the first aluminum alloy of the core layer is formed with portions of Si between 0 and 0.25%, with portions of Si between 0 and 0.15%, or with portions of Si between 0.1% and 0.25%.

13. The aluminum strip according to claim 1, wherein the first aluminum alloy of the core layer comprises at least the following portions:
Si 0-0.4%, 0-0.25%, 0-0.15%, or 0.1%-0.25%;
Fe 0-0.8%, 0-0.15%, 0-0.08%, or 0.05%-0.15%;
Cu 0.1-1.0%, or 0.4-0.8%; and
Mn 0.5-2.5%, or 0.7-1.5%.

14. The aluminum strip according to claim 1, wherein the first aluminum alloy of the core layer also comprises the following portions:
Mg<0.8%, or <0.6%; and
Ti<0.2%, or <0.1%.

15. The aluminum strip according to claim 1, wherein the first aluminum alloy of the core layer also comprises the following portions:
Cr, Zr, V, Zn<0.05%; and
Sn, Sr, Sc<0.005%.

16. The aluminum strip according to claim 1, wherein the core layer is more electropositive than the brown band layer by at least 5 mV.

17. A component, composed of an aluminum strip according to claim 1, having a strip thickness, wherein the component comprises a profile having a brazing connection and/or which is closed, and, in at least one area or in the area of the brazing connection:
the first part of the strip thickness is taken up by the core layer of the first aluminum alloy;
the at least the second part of the strip thickness is taken up by the at least one plating layer of a remaining thickness of the second aluminum alloy;
the first and second aluminum alloys are configured to form the brown band layer during a brazing process, and
at least a third part of the strip thickness is taken up by at least one brown band layer formed out of the first and the second aluminum alloy during the brazing process, or out of the plating layer and/or core layer of an original thickness,
wherein a strip thickness of the aluminum strip is less than 500 μm, and
wherein, in the at least one area, at least 5% of the strip thickness is taken up by the first aluminum alloy of the core layer and the brown band layer takes up more than 20% of the strip thickness, and the core layer is configured to be multi-layered with the one central main core layer and the at least one side core layer, and
wherein the brown band layer is formed between the at least one plating layer and the at least one side core layer.

18. The component according to claim 17, wherein the brown band layer does not take up more than 95% of the strip thickness.

19. The component according to claim 17, wherein the brown band layer takes up more than 30% of the strip thickness.

20. The component according to claim 17, wherein the brown band layer is formed of the side core layer having an original thickness.

21. The component according to claim 17, wherein, on at least one side of the core layer or on the side of the core layer through which fluid flows in the case of a tube, the second aluminum alloy of the plating layer and/or a further layer is formed of a further aluminum alloy having a portion of Zn greater than 0.2%.

22. The component according to claim 17, wherein, on at least one side of the core layer, or on the side of the core layer through which fluid flows in the case of a tube, a further layer is formed of pure aluminum, or is formed of aluminum of an aluminum alloy of the 1000 series, an AA1050 aluminum alloy or an AA1100 aluminum alloy.

23. The component according to claim 17, wherein at least the second part of the strip thickness is taken up by the at least one plating layer of a remaining thickness of the second aluminum alloy, which is disposed on both sides of the core layer.

24. The component according to claim 17, comprising:
a diametrically opposed first and a second broad wall which are interconnected by a diametrically opposed first and a second narrow wall, each of which forms a reforming region, the broad and narrow walls forming outer sides of a profile,
wherein the first and the second broad wall are connected to a segment which separates at least two chambers of the profile and form an inner side and/or outer side of the profile.

25. A manufacturing method for a component, comprising:
reshaping the component using a curving process and/or a folding process and/or a bending process in which a closed profile is formed, the component including an aluminum strip having a first part of a strip thickness being taken up by a multilayer core layer of a first aluminum alloy, and at least a second part of the strip thickness being taken up by at least one plating layer of a second aluminum alloy, the multilayer core layer including a central main core layer and at least one side core layer, the at least one plating layer being disposed directly on the side core layer of the multilayer core layer;
after the reshaping, brazing in at least one area of the aluminum strip to thereby form a brazing connection in the area;
forming a brown band layer, primarily of comprising the side core layer infused with silicon and having an original thickness before brazing, between the first and second aluminum alloys by diffusing Si from at least one of the first aluminum alloy and second aluminum alloy during the brazing; and
configuring a thickness of the side core layer and/or a thickness of the plating layer such that, after the brazing, at least 5% of the strip thickness that is taken up by the side core layer still remains in the at least one area or in the area of the brazing connection,
wherein the brown band layer takes up more than 20% of the strip thickness,
wherein the brown band layer is formed between the at least one plating layer and the at least one side core layer and directly contacts the at least one plating layer,
wherein the core layer is more electropositive than the brown band layer, and wherein the main core layer and the side core layer have a smaller portion of Si than the at least one plating layer, and the main core layer has a greater Si portion than the side core layer.

26. A heat exchanger to exchange heat between a first fluid, in particular an exhaust gas and/or charge air, and a second fluid, in particular a coolant, comprising:
a block for guiding the first fluid and the second fluid such that the first fluid and the second fluid are separated from one another and exchange heat, the block comprising:
a number of flow channels through which the first fluid can flow;
a first chamber which accommodates the flow channels and through which the second fluid can flow; and
a housing in which the chamber and the flow channels are disposed;
wherein a flow channel in the form of a tube is formed as the brazing component according to claim 17.

27. The heat exchanger according to claim 26, the heat exchanger is installed in a heater core or evaporator or coolant radiator or oil cooling system or condenser or exhaust-gas and/or charge-air heat exchanger for cooling exhaust gas and/or charge air in an exhaust-gas recirculation system and/or charge-air supply system of an internal combustion engine of a motor vehicle.

28. The manufacturing method according to claim 25, wherein the brown band layer takes up more than 30% of the strip thickness.

29. The aluminum strip according to claim 16, wherein the core layer is more electropositive than the brown band layer by at least 10 mV.

30. An aluminum strip for a brazing component, the aluminum strip comprising:
a profile having a brazing connection, wherein the aluminum strip has a strip thickness and, in at least one area or in the area of the brazing connection:
a first part of the strip thickness is taken up by a core layer of a first aluminum alloy; and
at least a second part of the strip thickness is taken up by a plating layer of a second aluminum alloy,
wherein the first aluminum alloy layer and the second aluminum alloy layer are configured to form a brown band layer during a brazing process,
wherein the core layer is at least 5 mV more electropositive than the brown band layer,
wherein a strip thickness of the aluminum strip is less than 500 μm and a thickness of the core layer and/or a thickness of the plating layer is configured such that after the brazing process at least 5% of the strip thickness that is taken up by the first aluminum alloy of the core layer still remains in the at least one area, and such that the brown band layer takes up more than 20% of the strip thickness,
wherein the core layer, before the brazing process, is configured to be multi-layered with one central main core layer and at least one side core layer,
wherein the second aluminum alloy layer is an aluminum alloy of the 4000 series (AA4xxx),
wherein the side core layer consists of an aluminum alloy of the 3000 series (AA3XXX), of the 5000 series (AA5XXX) or of the 6000 series (AA6XXX),
wherein the one central main core layer consists of an aluminum alloy of the 3000 series (AA3XXX), of the 5000 series (AA5XXX) or of the 6000 series (AA6XXX),
wherein the main core layer and the at least one side core layer have a smaller portion of Si than the plating layer, and the main core layer has a greater Si portion than the at least one side core layer, and
wherein the brown band layer comprises the side core layer infused with silicon and having an original thickness before brazing.

* * * * *

UNITED STATES PATENT AND TRADEMARK OFFICE
CERTIFICATE OF CORRECTION

| | | |
|---|---|---|
| PATENT NO. | : 10,926,361 B2 | Page 1 of 1 |
| APPLICATION NO. | : 13/117877 | |
| DATED | : February 23, 2021 | |
| INVENTOR(S) | : Gruenenwald et al. | |

It is certified that error appears in the above-identified patent and that said Letters Patent is hereby corrected as shown below:

On the Title Page

Item (75) Inventors: Bernd Gruenewald, Nuertingen (DE); Aleander Wald, Sindelfingen (DE); Alan Gray, Oxon (GB)

Should Read:
(75) Inventors: Bernd Gruenenwald, Nuertingen (DE); Aleander Wald, Sindelfingen (DE); Alan Gray, Oxon (GB)

Signed and Sealed this
Sixth Day of April, 2021

Drew Hirshfeld
*Performing the Functions and Duties of the
Under Secretary of Commerce for Intellectual Property and
Director of the United States Patent and Trademark Office*